(12) United States Patent
Amberson (10) Patent No.: US 7,497,049 B2
(45) Date of Patent: Mar. 3, 2009

(54) PLANTING BOARD SYSTEM

(76) Inventor: Eugene Amberson, 1575 Linden Dr., Madison, WI (US) 53706

( * ) Notice: Subject to any disclaimer, the term of this patent is extended or adjusted under 35 U.S.C. 154(b) by 356 days.

(21) Appl. No.: 11/440,314

(22) Filed: May 24, 2006

(65) Prior Publication Data

US 2007/0271840 A1    Nov. 29, 2007

(51) Int. Cl.
*A01G 9/02* (2006.01)
*B07B 1/49* (2006.01)
*B07B 13/00* (2006.01)
*B07C 5/12* (2006.01)
*F24B 15/00* (2006.01)

(52) U.S. Cl. .................. 47/66.5; 209/674; 209/680; 209/373; 209/404; 209/408

(58) Field of Classification Search ............ 47/18, 47/20.1, 29.6, 31.1, 65.5, 66.1–66.5; 209/680, 209/674, 373, 404, 408
See application file for complete search history.

(56) References Cited

U.S. PATENT DOCUMENTS 3,308,947 A * 3/1967 Dundam .................. 209/510

* cited by examiner

*Primary Examiner*—Christopher J. Novosad (57) ABSTRACT

A planting board system is provided for use in performing germination testing or planting within the flat of a seed type. The planting board system includes a housing, a lower panel disposed in the housing, said lower panel having a plurality of apertures disposed within the lower panel in a predetermined, spaced apart relationship and an upper panel disposed within the housing, the upper panel at least partially overlapping the lower panel and being moveable within the housing relative to the lower panel between first and second positions. The upper panel has a plurality of apertures that coincide with respective apertures of the plurality of apertures in the lower panel when the upper panel is in the second position, wherein each aperture of the plurality of apertures in the upper panel has a size that allows only one seed at a time of the seed type to fit into any one aperture of the plurality of apertures and wherein the upper panel has a seed reservoir that holds seed for the germination testing or the planting within the flat.

20 Claims, 13 Drawing Sheets

PLANTING BORD SYSTEM

FIELD OF THE INVENTION

The field of the invention lies in agriculture and more particularly in devices used in germination testing.

BACKGROUND OF THE INVENTION

Germination testing of seeds is an important part of agriculture practice and is often performed under laboratory conditions. Seed germination is tested to evaluate seed quality or viability and to predict the performance of the seed during growth conditions in the field. Under state and Federal laws, seeds offered for sale must be labeled based upon testing under a set of conditions specified by the Association of Official Seed Analysts Rules.

A number of different kinds of testing are used depending upon the potential uses of the seed and the type of seed to be tested. Each test is designed to assess various qualities of the seed. Factors that can affect the results of germination testing include the presence of diseases in the seeds, the age of the seeds, mechanical damage to the seeds, storage conditions (e.g., high moisture, heat, etc.) or excessive heat during drying of the seed.

In order to perform germination testing, seed is placed into a predetermined environment of moisture and temperature. The number and proximity of the seeds in any given test must be carefully controlled in order to judge the results (i.e., determine the percentage of seeds that germinate).

In germination testing, the number and proximity of seeds is typically controlled through the use of a planting board. A planting board is a device that includes a number of holes through which seed is dropped onto a germination medium (e.g., germination paper).

While the use of planting boards is effective, it is labor intensive and prone to failure in achieving their essential purpose of controlling the location and precise amount of seed used in each test. For example, seeds are often small and difficult to place in the holes of the planting board. Once seeds have been placed in the holes, any excess seed must be removed from the board in order to prevent the excess seed from incidentally falling through the holes and changing the seed count (and germination result). However, when excess seed is removed from the board, seed is also often dislodged from the holes. Where seeds are dislodged from the holes, the seeds may have to be repositioned in the holes in order to ensure an accurate seed count. Because of the importance of germination testing, a need exists for better methods and apparatus for handling seed during germination testing.

SUMMARY

A planting board system is provided for use in performing germination testing or planting within a flat of a seed type. The planting board system includes a housing, a lower panel disposed in the housing, said lower panel having a plurality of apertures disposed within the lower panel in a predetermined, spaced apart relationship and an upper panel disposed within the housing, the upper panel at least partially overlapping the lower panel and being moveable within the housing relative to the lower panel between first and second positions. The upper panel has a plurality of apertures that coincide with respective apertures of the plurality of apertures in the lower panel when the upper panel is in the second position, wherein each aperture of the plurality of apertures in the upper panel has a size that allows only one seed at a time of the seed type to fit into any one aperture of the plurality of apertures and wherein the upper panel has a seed reservoir that holds seed for the germination testing or planting within the flat.

DETAILED DESCRIPTION OF AN ILLUSTRATED EMBODIMENT

Figure 1:
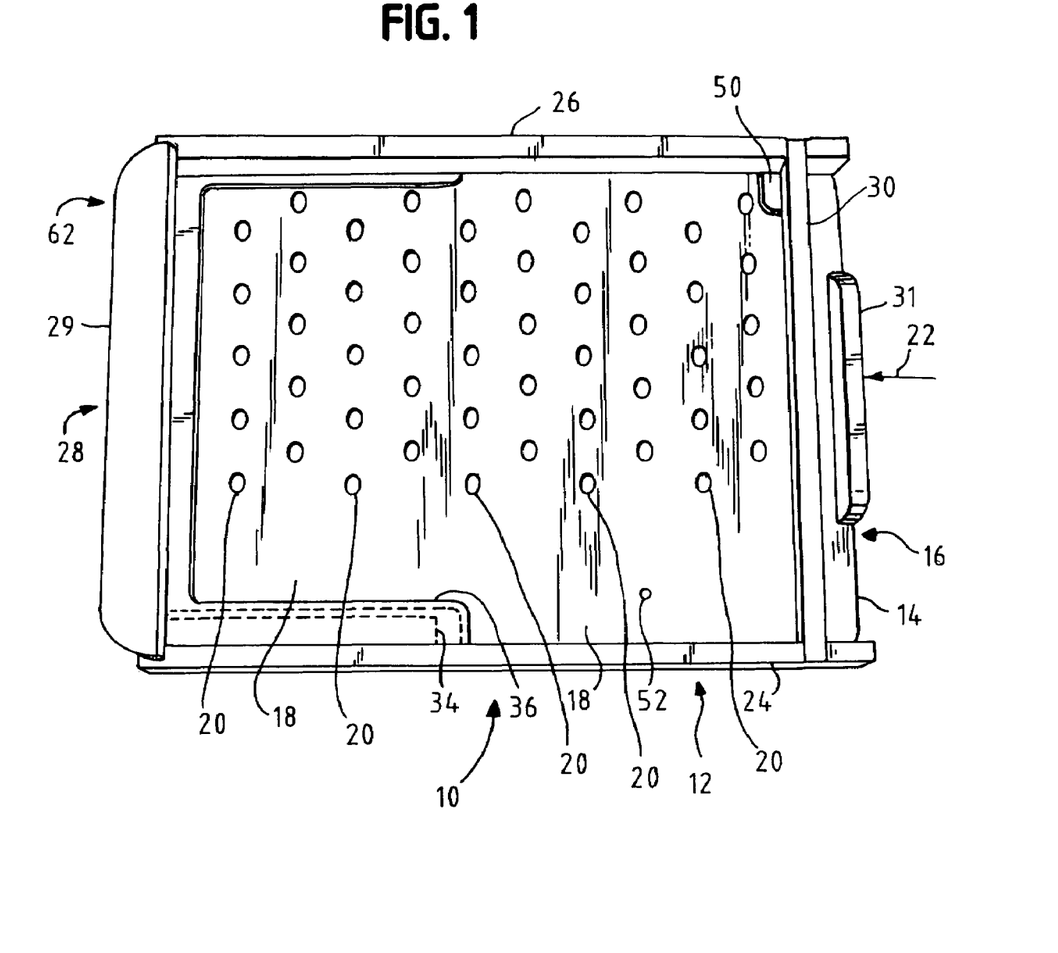
FIG. 1 is a top view of a planting board system in accordance with an illustrated embodiment of the invention.

FIG. 1 depicts a top view of a planting board system 10 shown generally in accordance with an illustrated embodiment of the invention. Included within the planting board system 10 may be a frame 12, an upper panel 14 and a lower panel 16. The upper panel 14 has a generally rectangular shape and is moveable with respect to the frame 12 and lower panel 16. The upper panel 14 is also provided with a number of apertures 20, each extending through the panel 14 in a predetermined spaced-apart relationship.

Figure 2:
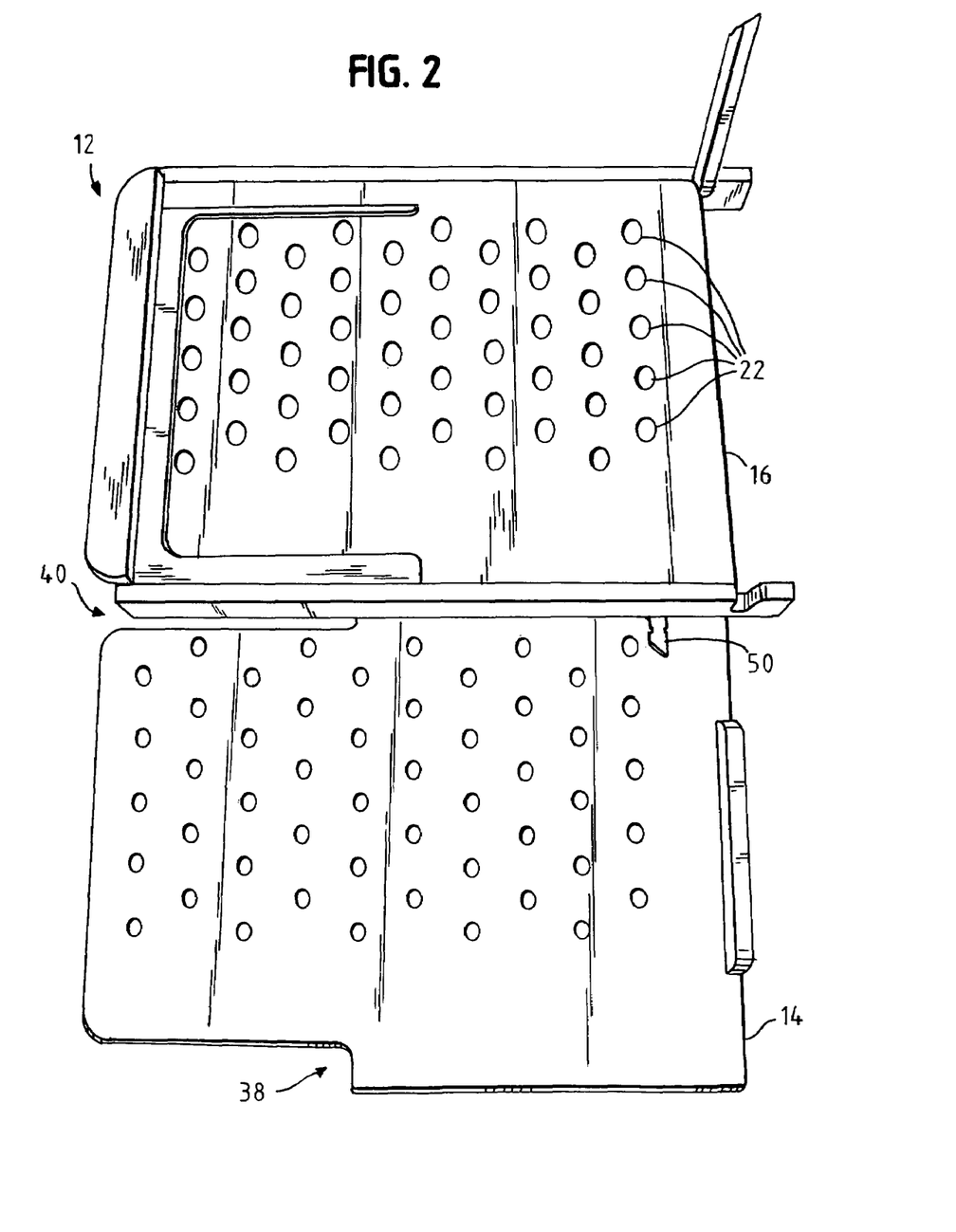
FIG. 2 is a top view of the planting board of FIG. 1 with the top panel removed and displayed adjacent a frame of the planting board.
Figure 3:
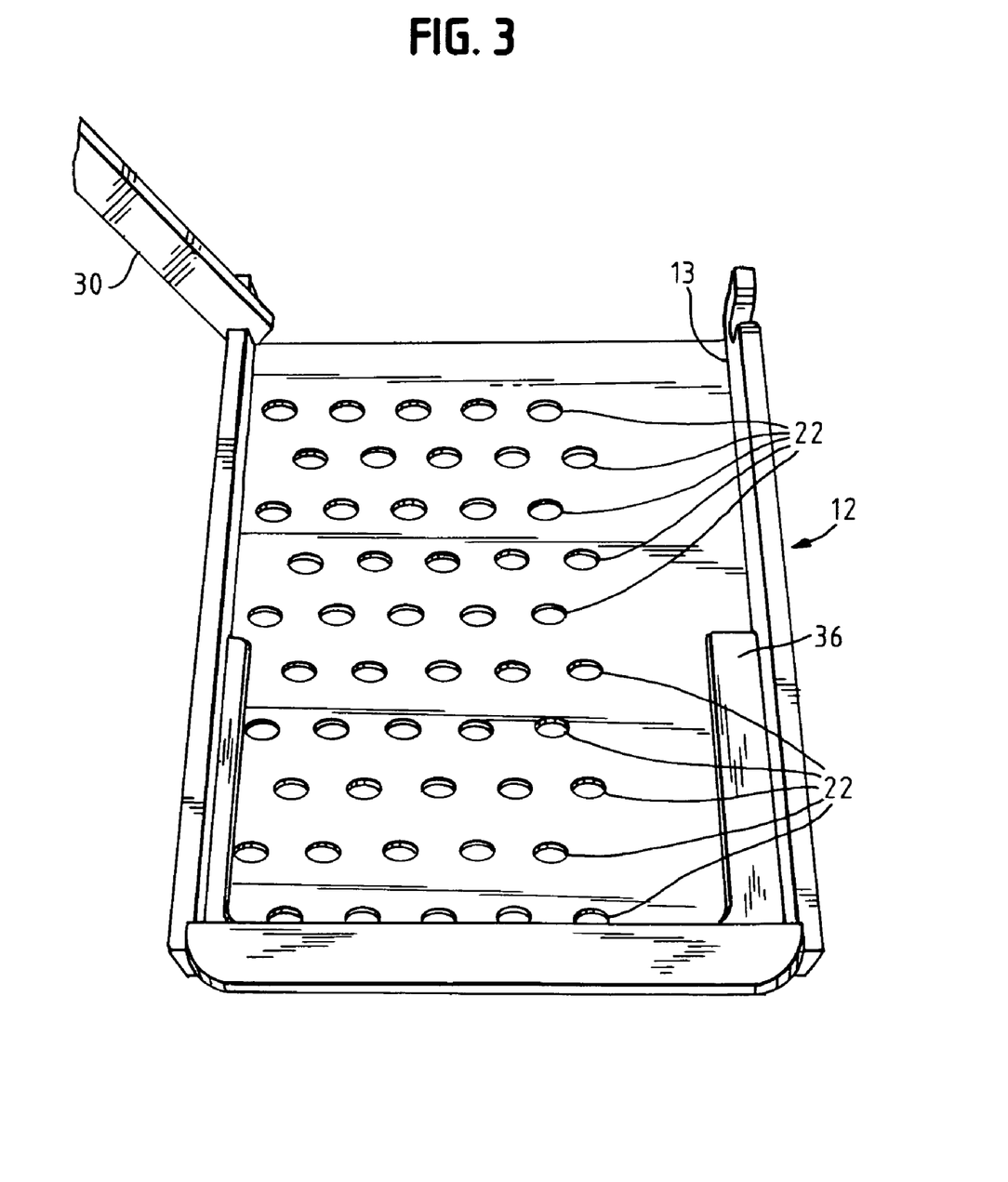
FIG. 3 is a top perspective view of the frame of the planting board system of FIG. 1 showing the keeper that retains the top panel.

FIG. 2 depicts a top perspective view of the planting board system 10 with the top panel 14 removed and displayed adjacent the frame 12 and lower panel 16. FIG. 3 shows another top view of the frame 12 and lower panel 16. As may be noted from FIGS. 2 and 3, the lower panel 16 also has a number of apertures 22, each extending through the lower panel 16, in the same predetermined spaced apart relationship as in the upper panel 14. In general, the apertures 22 in the lower panel 16 are larger by some proportionate factor (e.g., 50%) than the apertures 20 in the upper panel 14.

Figure 4:
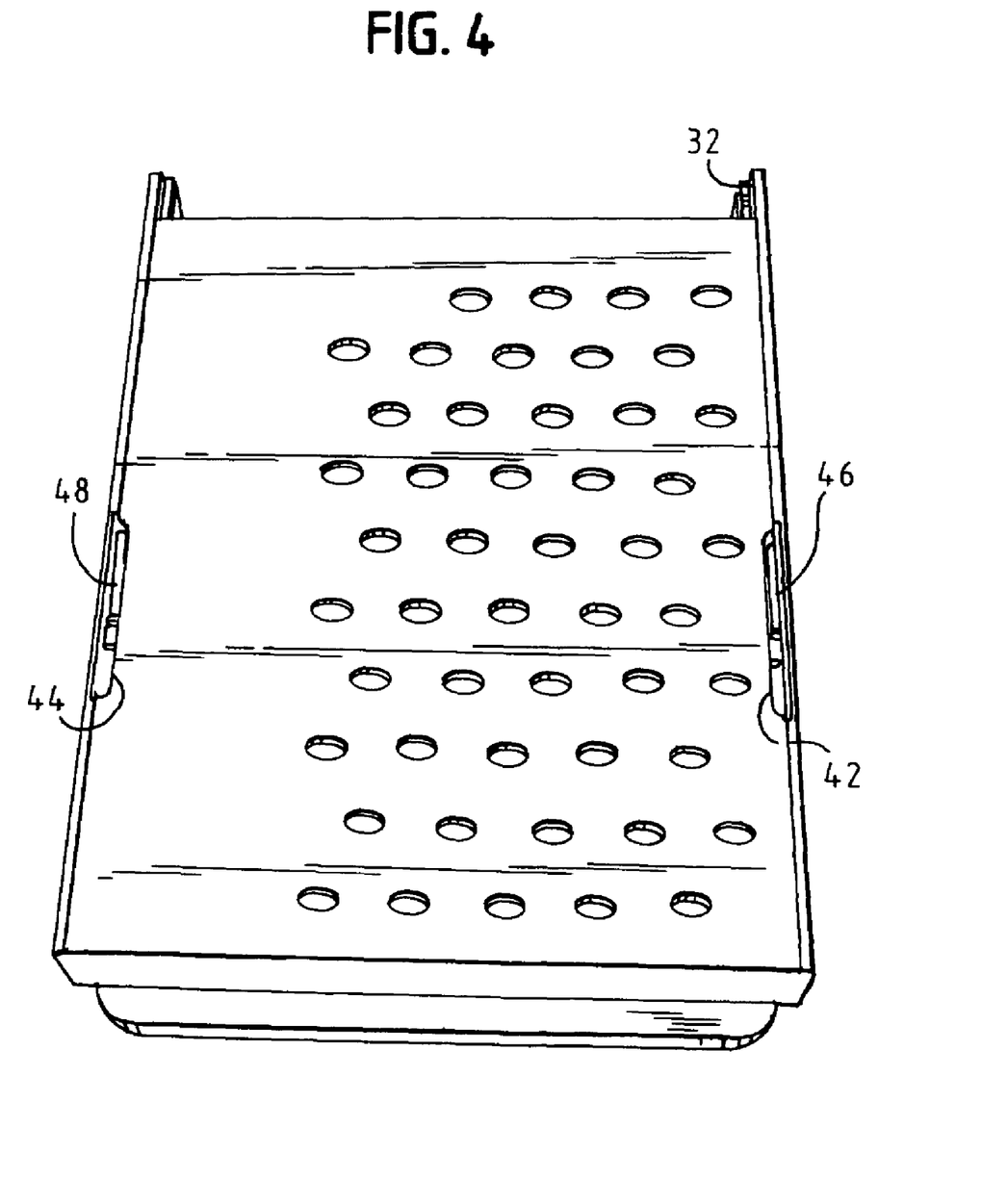
FIG. 4 is a bottom view of the planting board system of FIG. 1.

In general, the frame 12 may include a pair of generally parallel sidewalls 24, 26, an end assembly 28 and a gate assembly 30. The lower panel 16 may be rigidly fixed to the opposing sidewalls 24, 26 within a set of notches 32 (FIG. 4) formed in a lower, inside edge of the respective sidewalls 24, 26. The lower panel 16 may be fixed within the notches 32 of the sidewalls 24, 26 using any appropriate technology (e.g., glue, screws, etc.).

The sidewalls 24, 26 may also each be provided with a set of grooves 13, adjacent the notches 32 along their entire length. The upper panel 14 is received within the grooves 13.

Attached to a distal end and upper surface of the lower panel 16 is a set of spacers 34 and a keeper 36. The keeper 36 is attached to an upper surface of the spacers 34 and extends over the upper surface of the upper panel 14 and in conjunction with the grooves 13 retains the upper panel 14 in loose contact with the lower panel 16. A set of notches 38, 40 are provided in the upper panel to allow the upper panel 14 to slide past the spacers 34. The keeper 36 also prevents seed from entering and becoming lodged in the area between the distal end of the upper panel 14 and the end assembly 28 of the frame 12.

Figure 5:
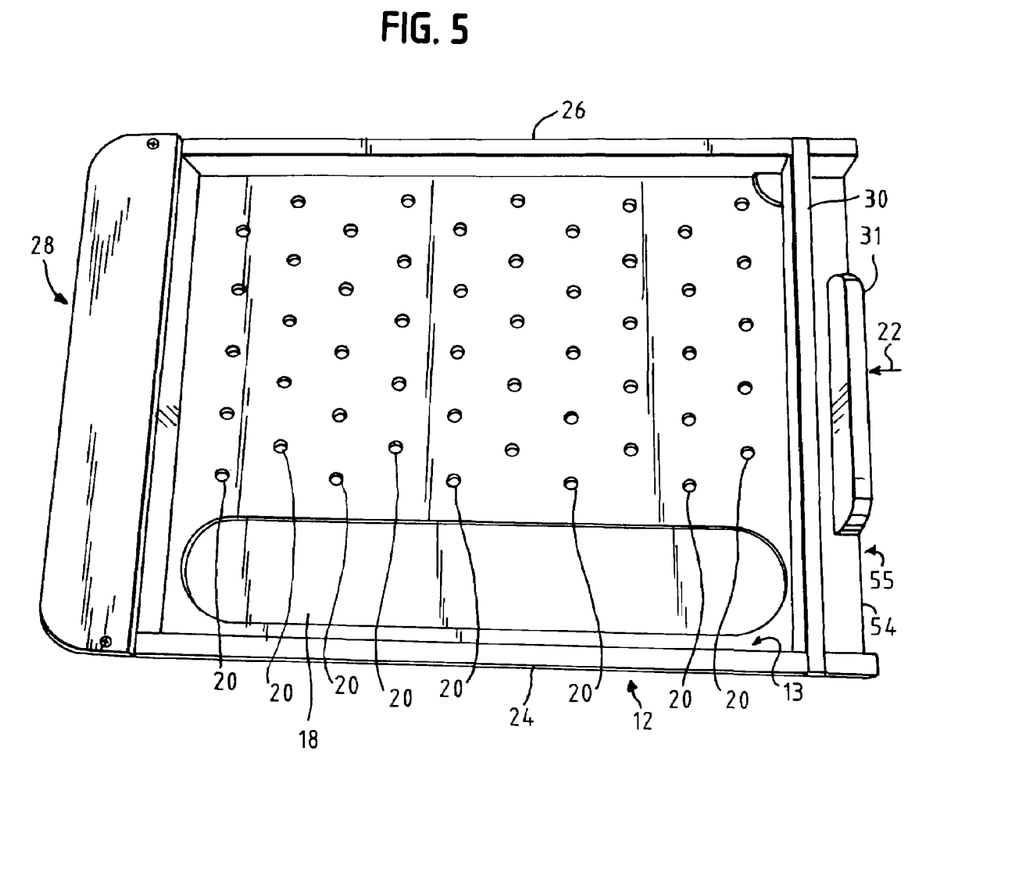
FIG. 5 is a top view of the planting board system of FIG. 1 under an alternate embodiment.

Disposed on the upper surface of the upper panel 14 is also a seed reservoir 18. The seed reservoir 18 may simply be an unobstructed area (no apertures 20) or the seed reservoir may be a recessed area cut into the upper surface of the upper panel 14 (as shown in FIG. 5).

The lower panel 16 may also include a pair of recesses 42, 44 (FIG. 4) cut into opposing sides of the lower panel 16. The recesses 42, 44 allow a pair of springs 46, 48 to be connected between the outside edge of the upper panel 14 and sidewalls 24, 26. The springs 46, 48 urge the upper panel 14 in a rearward direction towards the gate 30 until a stop 50 engages the gate 30.

The upper panel 14 operates between first and second positions. In the first position, the respective bottoms of the apertures 20 in the upper panel 14 are blocked by the lower panel 16 and seeds are held within (and cannot fall through) the apertures 20. In the second position, the apertures 20 in the upper panel 14 are coincident (substantially coaxial) with the apertures 22 in the lower panel to allow seeds to fall through the respective apertures 20, 22.

The apertures 20 may be sized for the type of seed used during germination testing. In this regard, the diameter of the apertures 20 may be such that only one seed of the seed type will fit into any one aperture 20.

To load the planting board 10, the gate 30 may be closed as shown in FIG. 1 and seeds 52 may be poured onto and come to rest on the upper surface of the upper panel 14. Alternatively, the seeds 52 may be poured into the reservoir area 18.

The seeds 52 may be transported to and brought to rest in each of the apertures 20 with the help of a user (not shown). The user may manually move the seed 52 into each aperture 20 by simply holding the planting board 10 in both hands and rapidly moving the planting board 10 in a circular direction or side-to-side direction to cause the seed 52 to slide across the panel 14 into the respective apertures 20. If any empty apertures 20 remain, the user may manually move a seed 52 into the aperture 20.

Once the apertures 20 have been filled, the user may move any remaining seed 52 to the reservoir 18 by gently striking the sidewall 24 with his hand to jar the remaining seed 52 into the reservoir area 18. Once any excess seed 52 has been removed from the area of the apertures 20, the user may deposit the seeds in the apertures 20 onto germination paper for the germination test by placing his thumb and forefinger across the gate 30 and proximal handle 31 and squeezing. Squeezing causes the upper panel 14 to move in the direction depicted by the arrow 22. Movement of the upper panel 14 in the direction 22 causes the upper panel 14 to move from the first position (where the bottom of the respective apertures 20 are blocked) to the second position (where the apertures 20, 22 are coaxially aligned). Once the apertures 20, 22 are aligned, the seeds 52 fall through the planting board 10 onto the germination paper for the actual germination testing.

Once the seeds 52 have been discharged onto the germination paper, the processing may be repeated. However, in this case, the holes 20 may be filled with seed 52 from the reservoir 18.

Figure 6:
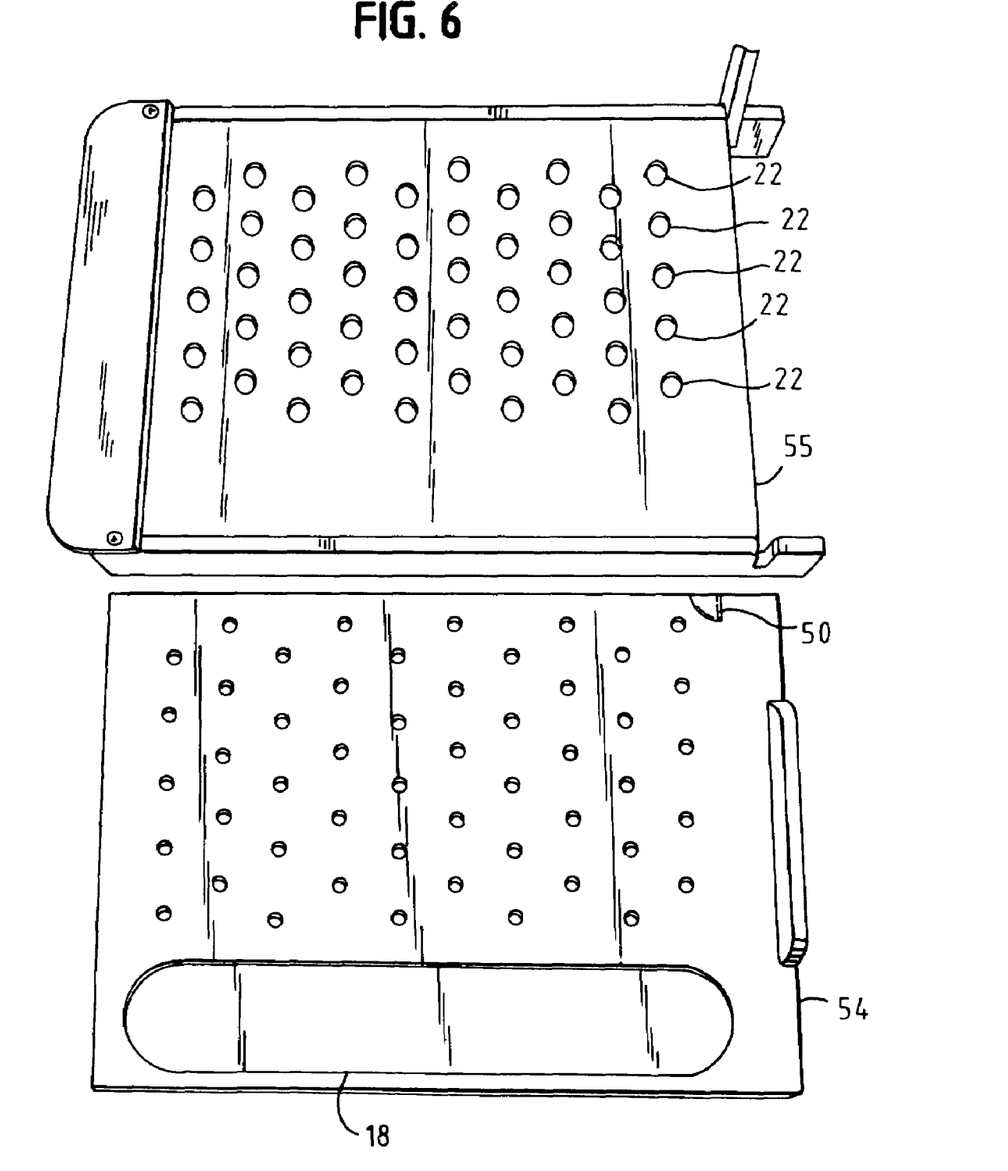
FIG. 6 is a top view of the planting board of FIG. 5 with the top panel removed and displayed adjacent a frame of the planting board.
Figure 7:
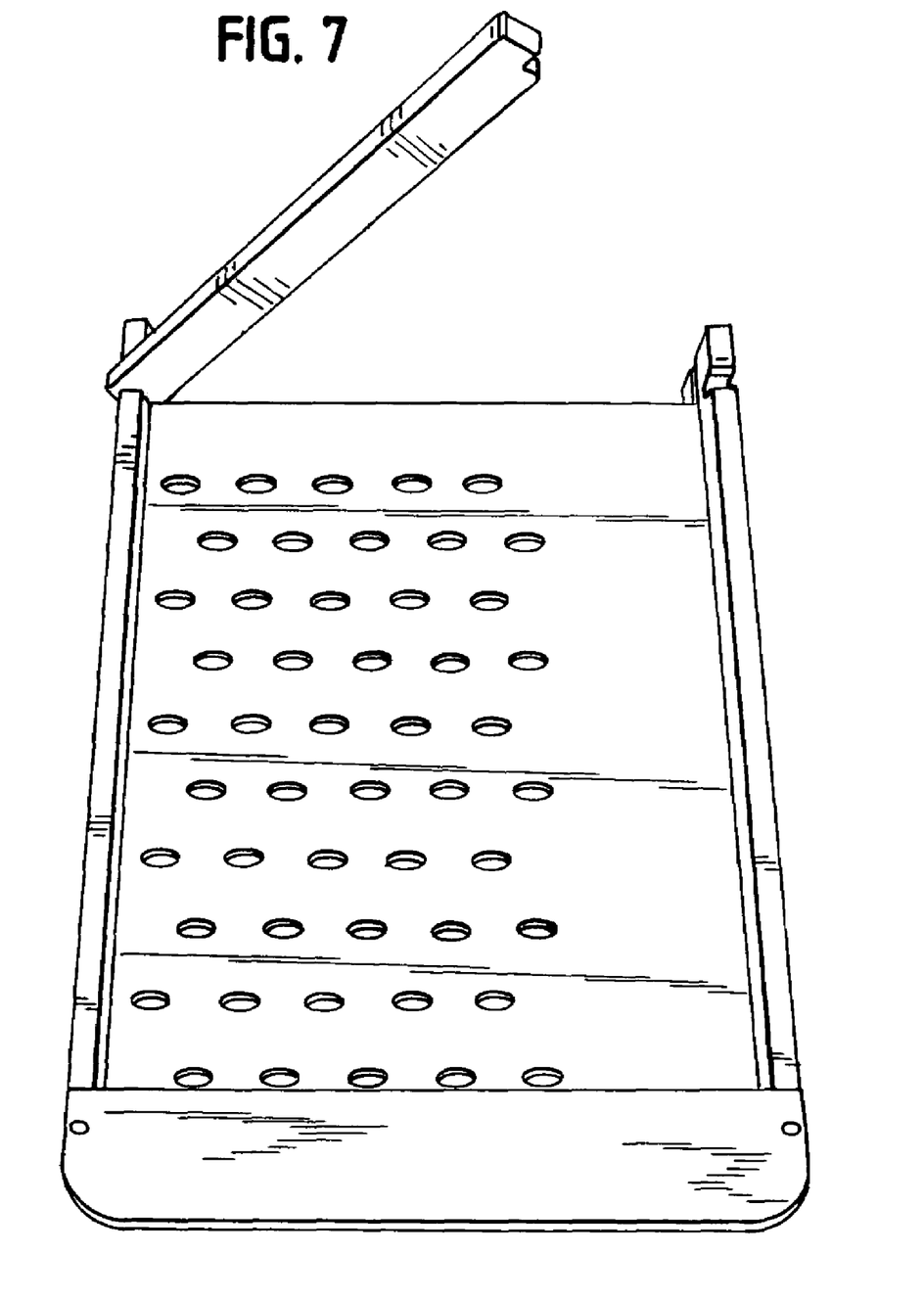
FIG. 7 is a top view of the frame of the planting board system of FIG. 5.

In an alternate embodiment (FIGS. 5-8), the planting board 10 uses a single leaf spring (as opposed to the two coil springs 46, 48 used in conjunction with the upper panel 14 of FIGS. 1-4). The upper panel (now referred to by reference number 54) has an uninterrupted rectangular shape. As shown in FIG. 6, the upper panel 54 does not have the notches 38, 40 that are present in the upper panel 14 of FIG. 2.

Similarly, the lower panel (now referred to by reference number 55) also has an uninterrupted rectangular shape. The lower panel 55 also does not require the spacer 34 or keeper 36 of the lower panel 16 of FIGS. 1-4.

Figure 8:
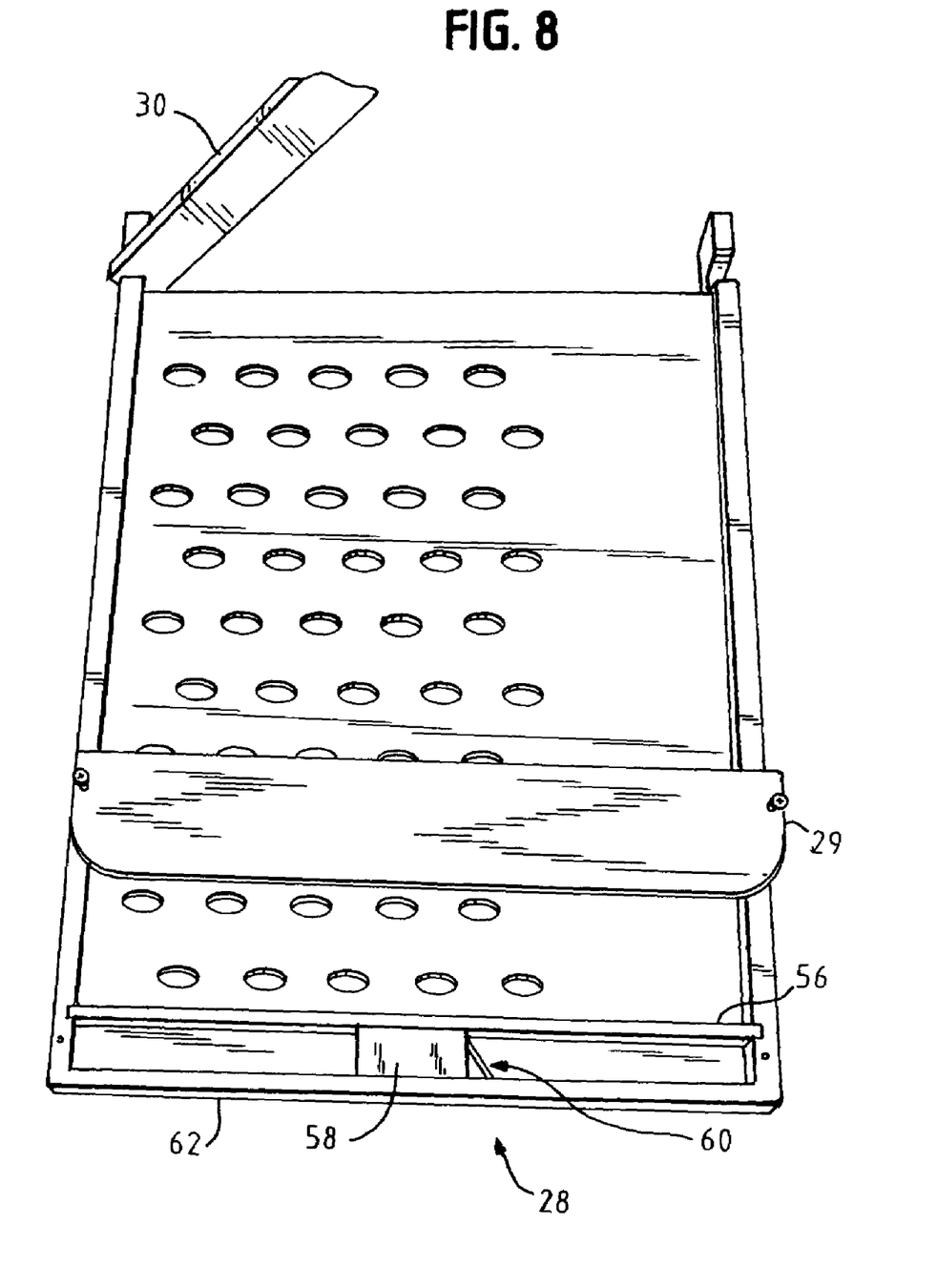
FIG. 8 is a partially dissembled top view of the planting board system of FIG. 7.

FIG. 8 shows the end assembly 28 with the cover 29 removed. As shown, a cross bar 56 now connects opposing side walls 24, 26. The cross bar 56 is positioned a sufficient distance above the lower panel 55 so as to allow the upper panel 54 to pass underneath (i.e., between the cross bar 56 and lower panel 55 and functions to urge the upper panel 54 into contact with the lower panel 55 and to prevent seed from entering the area past the distal end of the upper panel 54.

A leaf spring 60 of an appropriate shape (e.g., a "W" or "V" shape) is disposed between the cross bar 56 and end wall 62. A stabilizer block 58 may reinforce the cross bar 56 and retain the leaf spring 60 in the direct path of the upper panel 54.

Figure 9:
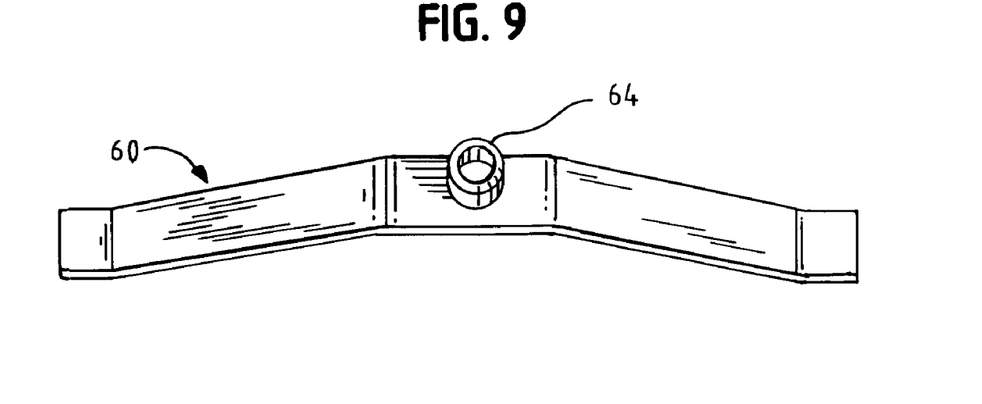
FIGS. 9-10 depict end and top views of a leaf spring that may be used with the planting board system of FIG. 1.
Figure 10:
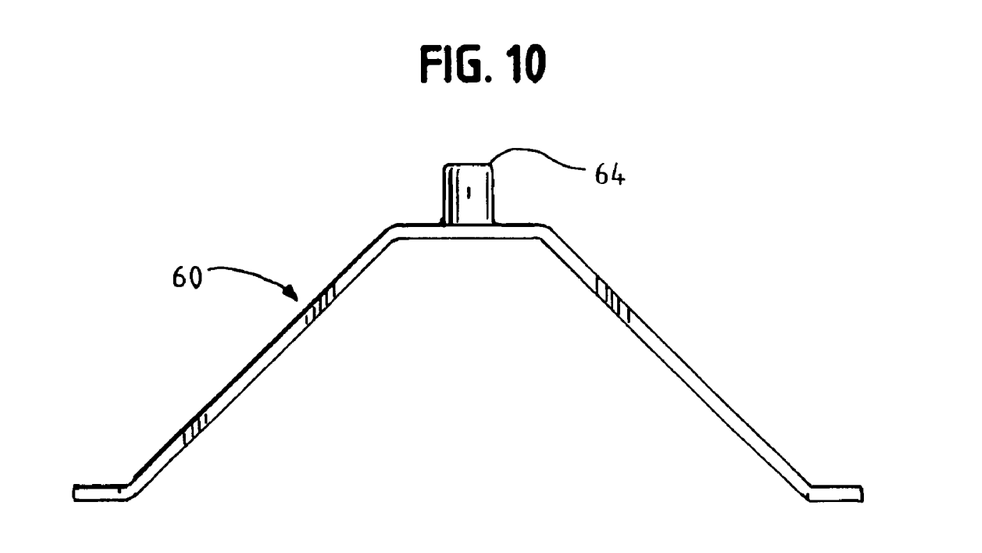
Figure 11:
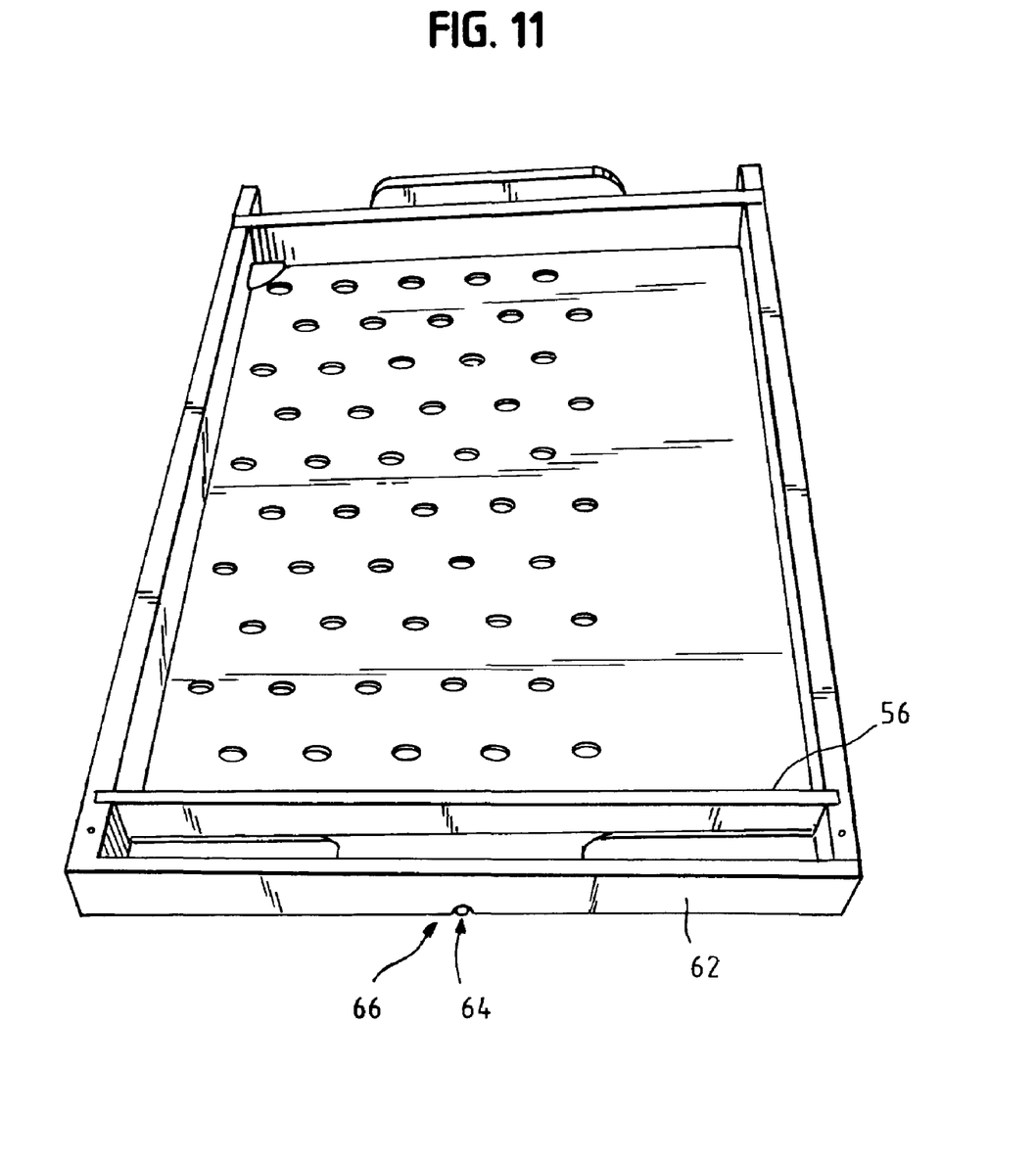
FIG. 11 depicts use of the leaf spring of FIGS. 9-10 within the planting board system of FIG. 5.

FIGS. 9 and 10 show front and top view of a snap-button leaf spring 60 that may be used between the cross bar 56 and end wall 62. As shown in FIG. 11, a small aperture 66 through the end wall 62 receives the button 64 of the snap-button leaf spring 60 to further stabilize the spring 60.

In the embodiment shown in FIGS. 5-8, the lower panel 55 is rigidly fixed to the opposing walls 24, 26 in a manner similar to that discussed above. The opposing walls 24, 26 are, again, provided with a set of grooves 13 along their length and the upper panel 54 slides along those grooves 13. As above, the grooves 13 hold the upper panel 54 in contact with the lower panel 55.

The gate 30 and stop 50 keeps the upper panel 54 from sliding out of the planting board frame and keeps the seed from sliding off the planting board during operation. The gate 30 may be raised to change the upper panel 54 for another upper panel 54 with a different size aperture 20 for a different seed size. The gate 30 may also be raised to pour off excess seed after the planting of multiple replications of each seed lot tested. The cross-bar 56 prevents seed from entering the area between the distal end of the upper panel 54 and the end assembly 28.

The planting board 10 of FIGS. 5-8 may be used in substantially the same way as the planting board 10 of FIGS. 1-4. The gate 30 is closed and seed 52 is poured onto the upper panel 54. The seed 52 is distributed into the apertures 20 as described above. The user places the planting board 10 above the germination paper and squeezes the gate 30 and handle 31 between his thumb and forefinger to urge the panel 54 from the first to the second position. As above, in the first position the bottom of the respective apertures 20 are blocked by the lower panel 55. In the second position, the apertures of the upper panel 54 are coaxially aligned with the apertures 22 in the lower panel 55 allowing the seeds 52 to fall through onto the germination paper.

Figure 14:
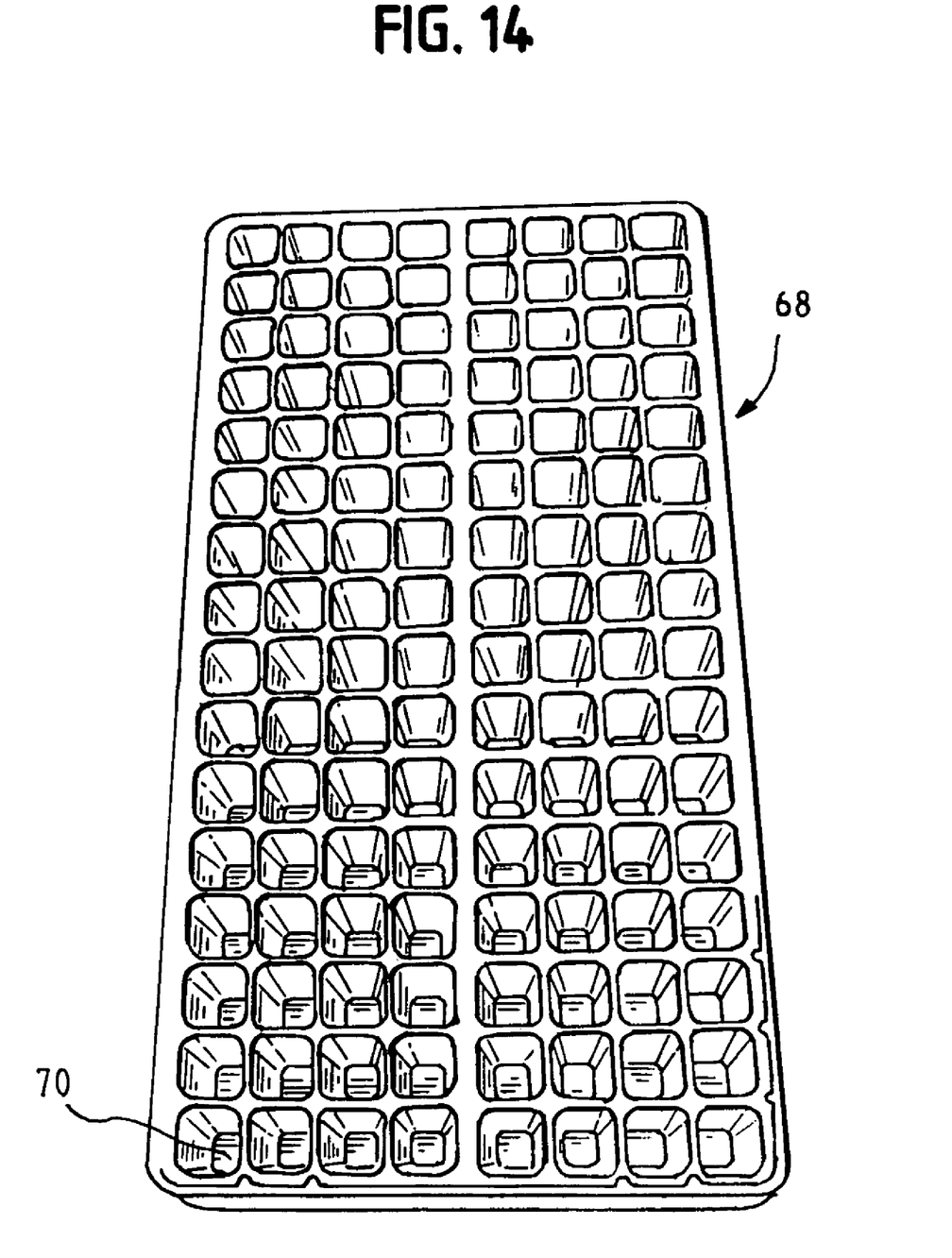
FIG. 14 depicts a seed flat that may be used in the embodiment of FIG. 13.

In another embodiment, the planting board system 10 may be used in conjunction with a planting flat 68 of FIG. 14 as part of a greenhouse planting system. The planting flat 68, contains a number of apertures 70 that correspond in number and location to the apertures 20, 22 of the planting board 10.

The apertures 70 of the planting flat may be filed with a potting mix and the planting board 10 may be used to precisely place a single seed in each aperture.

Figure 12:
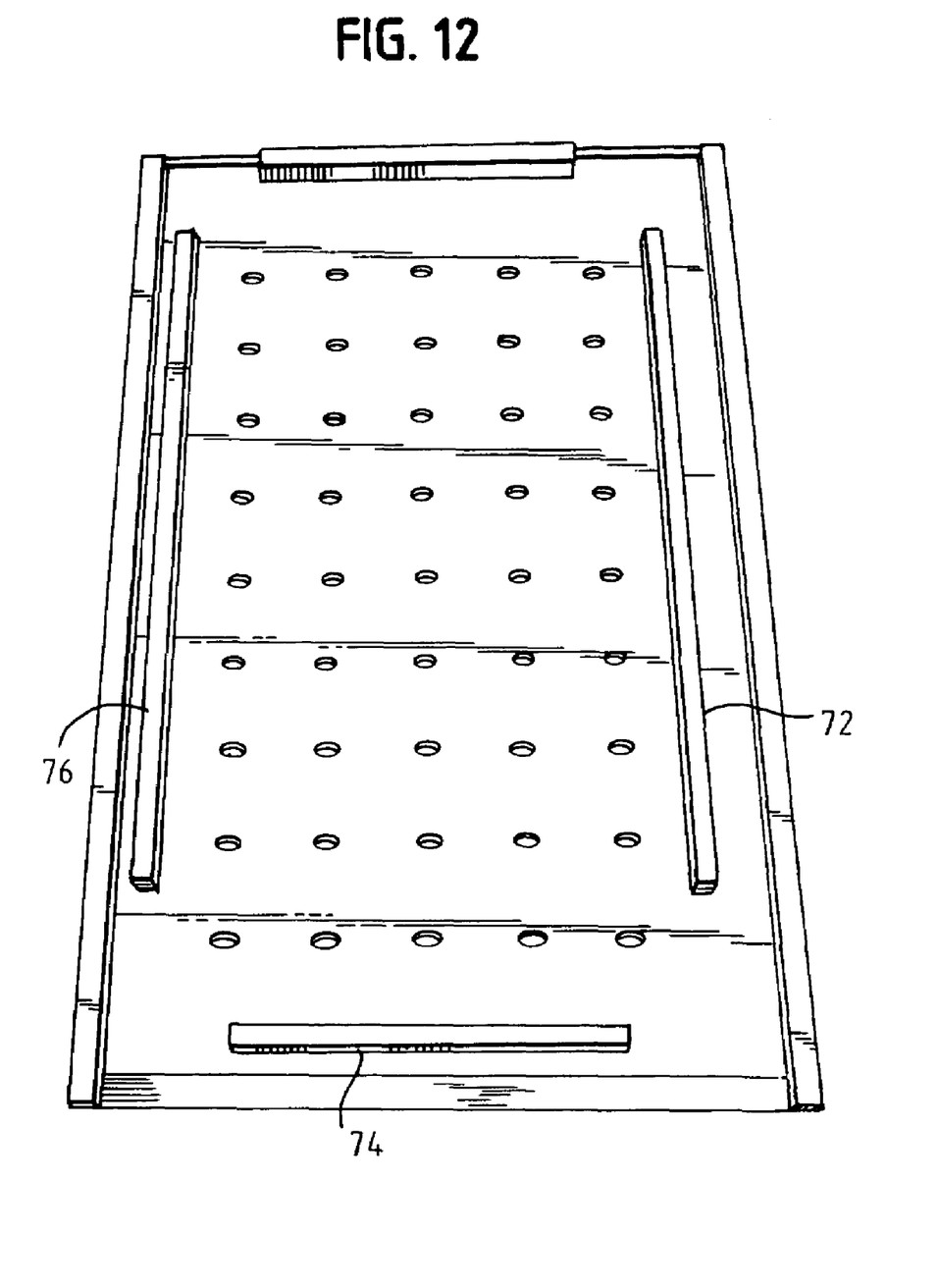
FIG. 12 depicts use of the planting board system of FIG. 5 under an alternate embodiment.
Figure 13:
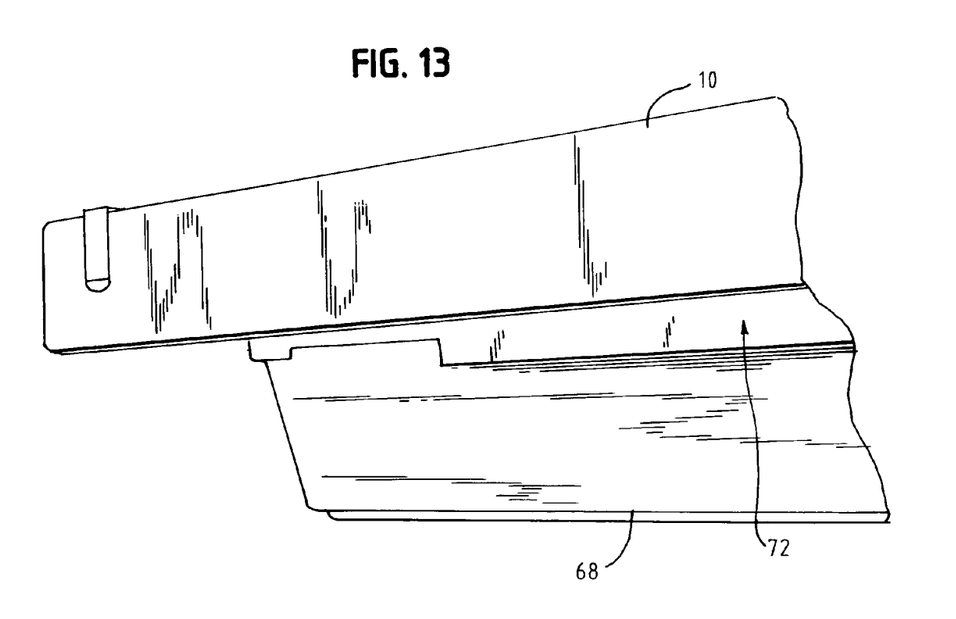
FIG. 13 depicts use of the planting board system of FIG. 12 in a context of use.

A set of guides 72, 74, 76 are secured to a bottom of the planting board 10 as shown in FIG. 12. The board 10 is placed on top of the flat 68 as shown in FIG. 13. In this case, the guides 72, 74, 76 act to precisely align the apertures 20, 22 of the planting board 10 with the apertures 70 of the flat 68. Upon alignment of the board 10 to the flat 68, the upper panel 14, 54 may be urged into the second position to deposit a seed into each aperture 70.

A specific embodiment of a planting board system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A planting board system for use in performing germination testing or planting within a flat for a predetermined type of seed, the planting board system comprising:
    a housing;
    a lower panel disposed in the housing, said lower panel having a plurality of apertures disposed within the lower panel in a predetermined, spaced apart relationship;
    an upper panel disposed within the housing, the upper panel at least partially overlapping the lower panel and being moveable within the housing relative to the lower panel between first and second positions, the upper panel having a plurality of apertures that coincide with respective apertures of the plurality of apertures in the lower panel when the upper panel is in the second position, wherein a bottom of the apertures of the upper panel are blocked by the lower panel when the upper panel is in the first position and where each blocked aperture of the plurality of apertures in the upper panel has a size that allows only one seed at a time of the seed type to fit into any one aperture of the plurality of apertures and wherein the upper panel has a seed reservoir that holds seed for the germination testing or planting in the flat.

2. The planting board system as in claim 1 further comprising a spring that urges the upper panel into the first position.

3. The planting board system as in claim 2 wherein the upper panel further comprises a set of opposing sidewalls that limits horizontal movement of the upper panel to an axis that is parallel to the opposing sidewalls and an end wall that defines the second position of the upper panel when the upper panel is proximate the end wall.

4. The planting board system as in claim 3 wherein the spring further comprises a pair of coil springs with each coil spring of the pair of coil springs disposed adjacent a respective side wall of the set of opposing side walls with a first end of the coil spring connected to the upper panel and a second end connected to the respective side wall.

5. The planting board system as in claim 3 wherein the spring further comprises a leaf spring disposed on the end wall.

6. The planting board system as in claim 5 wherein the leaf spring further comprises a cross bar disposed on the end wall that retains the leaf spring in a path of the upper panel.

7. The planting board system as in claim 1 wherein the seed reservoir further comprises a depression in a surface of the upper panel that is adjacent a sidewall with a longitudinal dimension that extends parallel to an axis of movement between the first and second positions.

8. A planting board system for use in performing a germination test or planting within a flat for a predetermined type of seed, the planting board system comprising:
    a housing;
    a lower panel disposed in the housing, said lower panel having a plurality of apertures disposed within the lower panel in a predetermined, spaced apart relationship;
    an upper panel disposed within the housing, the upper panel having a plurality of apertures, the upper panel having a first position in which the lower panel blocks a bottom of each aperture of the plurality of apertures in the upper panel and a second position wherein the apertures in the upper panel are coincident with the respective apertures in the lower panel and allow any seeds in the plurality of apertures in the upper panel to fall through the planting board system, where the blocked apertures of the upper panel have a size that allows only one seed of the seed type at a time to fit into the aperture and wherein the upper panel has a seed reservoir that receives any excess seed of the germination test or planting within the flat.

9. The planting board system as in claim 8 wherein the seed reservoir further comprises a depression in a surface of the upper panel that is adjacent a sidewall of the opposing sidewalls with a longitudinal side that extends parallel to the sidewall.

10. The planting board system as in claim 8 wherein the upper panel further comprises a set of opposing sidewalls that limits movement of the upper panel to an axis that is parallel to the opposing sidewalls and an end wall that defines the second position of the upper panel when the upper panel is proximate the end wall.

11. The planting board system as in claim 10 further comprising a leaf spring disposed between the end wall and a distal end of the upper panel and that urges the upper panel into the first position.

12. The planting board system as in claim 11 further comprising a cross bar and retaining block that retain the leaf spring between the upper panel and end wall in a path of the upper panel.

13. The planting board system as in claim 10 further comprises a pair of coil springs where each coil spring of the pair of coil springs is disposed adjacent a respective side wall of the set of opposing side walls with a first end of the coil spring connected to the upper panel and a second end connected to the respective side wall so as to pull the upper panel into the first position.

14. A planting board system for use in performing a germination test or planting within a flat for a predetermined type of seed, the planting board system comprising:
    a lower panel having a plurality of apertures disposed within the lower panel in a predetermined, spaced apart relationship;
    an upper panel that at least partially overlaps the lower panel said upper panel having a plurality of apertures the number and placement of which substantially match the predetermined spaced apart relationship of the apertures in the lower panel, the upper panel having a first position relative to the lower panel in which the lower panel blocks a bottom of each aperture of the plurality of apertures in the upper panel and a second position relative to the lower panel wherein the apertures in the upper panel are coincident with the apertures in the lower panel and allow any seeds in the plurality of apertures in the upper panel to fall through the planting board system, where the blocked apertures of the upper panel have a size that allows only one seed of the seed type at a time to fit into the aperture and wherein the upper panel has a seed reservoir that receives any excess seed of the germination test or the planting within the flat.

15. The planting board system as in claim 14 wherein the lower panel further comprising a frame that including a set of opposing sidewalls that limits movement of the upper panel to an axis that is parallel to the opposing sidewalls and an end wall that defines the second position of the upper panel when the upper panel is proximate the end wall.

16. The planting board system as in claim 15 further comprises a spring that urges the upper panel into the first position.

17. The planting board system as in claim 15 wherein the frame further comprises a gate and a stop that secures the upper panel in the first position.

18. The planting board system as in claim 15 wherein the spring further comprises a pair of coil springs with each coil spring of the pair of coil springs disposed adjacent a respective side wall of the set of opposing side walls with a first end of the coil spring connected to the upper panel and a second end connected to the respective side wall.

19. The planting board system as in claim 15 wherein the spring further comprises a leaf spring disposed between the end wall and a distal end of the upper panel and that urges the upper panel into the first position.

20. The planting board system as in claim 19 further comprising a cross bar and retaining block that retains the leaf spring in a path of the upper panel between the upper panel and end wall.

* * * * *